US008838821B2

(12) United States Patent
Feingold et al.

(10) Patent No.: US 8,838,821 B2
(45) Date of Patent: Sep. 16, 2014

(54) DYNAMIC TRANSACTION PROTOCOL UPGRADES

(75) Inventors: Max Feingold, Bellevue, WA (US); Jim Johnson, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/614,897

(22) Filed: Sep. 13, 2012

(65) Prior Publication Data

US 2013/0046900 A1  Feb. 21, 2013

Related U.S. Application Data

(63) Continuation of application No. 11/742,823, filed on May 1, 2007, now Pat. No. 8,291,097.

(60) Provisional application No. 60/884,410, filed on Jan. 10, 2007.

(51) Int. Cl.
  *G06F 15/16* (2006.01)
  *G06F 15/173* (2006.01)

(52) U.S. Cl.
  USPC .......................... 709/230; 709/223; 709/227

(58) Field of Classification Search
  USPC .............. 709/203–206, 217–219, 223–230
  See application file for complete search history.

(56) References Cited

U.S. PATENT DOCUMENTS

| 6,192,410 | B1* | 2/2001 | Miller et al. ................... 709/232 |
| 6,976,080 | B1* | 12/2005 | Krishnaswamy et al. ..... 709/230 |
| 7,761,584 | B2* | 7/2010 | Langworthy et al. ......... 709/230 |
| 2002/0004834 | A1* | 1/2002 | Guenther et al. ............. 709/230 |
| 2002/0107967 | A1* | 8/2002 | Klein et al. ................... 709/227 |
| 2002/0161895 | A1* | 10/2002 | Appiah et al. ................ 709/227 |
| 2003/0069995 | A1* | 4/2003 | Fayette ......................... 709/249 |
| 2003/0172054 | A1 | 9/2003 | Berkowitz et al. |
| 2004/0003089 | A1* | 1/2004 | Chiu ............................ 709/227 |
| 2004/0024731 | A1 | 2/2004 | Cabrera et al. |
| 2004/0039855 | A1 | 2/2004 | Bohrer et al. |
| 2005/0125503 | A1 | 6/2005 | Iyengar et al. |
| 2005/0144299 | A1 | 6/2005 | Blevins et al. |
| 2005/0144301 | A1 | 6/2005 | Park et al. |
| 2006/0123128 | A1* | 6/2006 | Feingold et al. ............. 709/230 |
| 2006/0239296 | A1 | 10/2006 | Jinzaki et al. |
| 2006/0259628 | A1* | 11/2006 | Vadlapudi et al. ........... 709/227 |
| 2007/0028001 | A1* | 2/2007 | Phillips et al. ............... 709/238 |
| 2008/0155051 | A1 | 6/2008 | Moshayedi |
| 2008/0155089 | A1* | 6/2008 | Hunt et al. ................... 709/224 |
| 2008/0168469 | A1 | 7/2008 | Feingold et al. |

OTHER PUBLICATIONS

Cabrera et al., "Web Services Coordination (WS-Coordination)," Aug. 2005, Version 1.0.

(Continued)

*Primary Examiner* — Jenee Williams
(74) *Attorney, Agent, or Firm* — Ben Tabor; Kate Drakos; Micky Minhas

(57) ABSTRACT

Including support for advanced protocols in propagation information transferred between applications. Transaction managers associated with the applications communicate with each other to complete a transaction. Rather than communicating using a standard protocol, embodiments of the invention enable a first transaction manager to identify advanced protocols supported by the first transaction manager to a second transaction manager using existing propagation tokens. The second transaction manager selects one of the supported protocols to communicate with the first transaction manager to complete the transaction.

20 Claims, 2 Drawing Sheets

(56) References Cited

OTHER PUBLICATIONS

U.S. Appl. No. 11/742,823, Office Action mailed Jul. 13, 2009, 18 pgs.
U.S. Appl. No. 11/742,823, Amendment and Response filed Oct. 13, 2009, 15 pgs.
U.S. Appl. No. 11/742,823, Office Action mailed Mar. 10, 2010, 24 pgs.
U.S. Appl. No. 11/742,823, Amendment and Response filed Aug. 10, 2010, 10 pgs.
U.S. Appl. No. 11/742,823, Notice of Allowance mailed Jun. 18, 2012, 14 pgs.

* cited by examiner

DYNAMIC TRANSACTION PROTOCOL UPGRADES

CROSS-REFERENCE TO RELATED APPLICATIONS

This application is a continuation application of U.S. patent application Ser. No. 11/742,823 (now U.S. Pat. No. 8,291,097), entitled "DYNAMIC TRANSACTION PROTOCOL UPGRADES," filed on May 1, 2007, which claims the benefit of U.S. Provisional Application No. 60/884,410, filed Jan. 10, 2007, the complete disclosures of which are hereby incorporated by reference in their entirety.

BACKGROUND

Distributed applications work together to complete a task. Transaction managers associated with each of the applications communicate propagation information to each other to coordinate completion of the task. The transaction managers may have several transaction protocols available to use for communication with each of the transaction protocols possibly requiring different propagation information. In existing systems, there is a lack of interoperability between these protocols. As such, the existing systems are neither extensible nor dynamic.

Further, in existing systems, the decision as to what propagation information to carry between the applications is typically made before the applications become aware of the existence of the other applications that will help complete the task. Consequently, the choice of transaction protocol in existing systems is made too early or in an uninformed fashion without taking into account specific aspects of protocol versioning and support, topological circumstances, or other characteristics that might influence the choice of protocol.

Some existing systems have propagation information formats that explicitly support several potential transaction protocols. In such existing systems, transaction managers implement particular protocols for communication between the transaction managers by hardcoding support for the particular protocols into the transaction managers.

These existing approaches suffer in several ways. For example, the propagation information format must be revised whenever support for a new transaction protocol is added to a transaction manager. In another example, there are many protocols, including de-facto and de-jure standards, that do not support this feature. In particular, a transaction manager that supports a standard protocol also supports a high performance and more feature rich advanced protocol. Existing transaction managers fail to provide propagation information that allows interaction with both transaction managers that support the standard protocol and transaction managers that support an advanced protocol. In particular, the propagation information in existing systems lacks information enabling a transaction manager that supports an advanced protocol to negotiate up to the advanced protocol when the transaction manager finds itself communicating with another transaction manager that also supports the advanced protocol.

SUMMARY

Embodiments of the invention enable applications to coordinate completion of a task. In an embodiment, the invention includes generating propagation information describing communication protocols supported by a first transaction manager associated with an application. The propagation information is associated with a propagation information packet or token for delivery to another application. The other application has a second transaction manager associated therewith. The first transaction manager and the second transaction manager negotiate to select a communication protocol to use to coordinate completion of the task. The selection of the communication protocol is based on the propagation information set forth by the first transaction manager.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
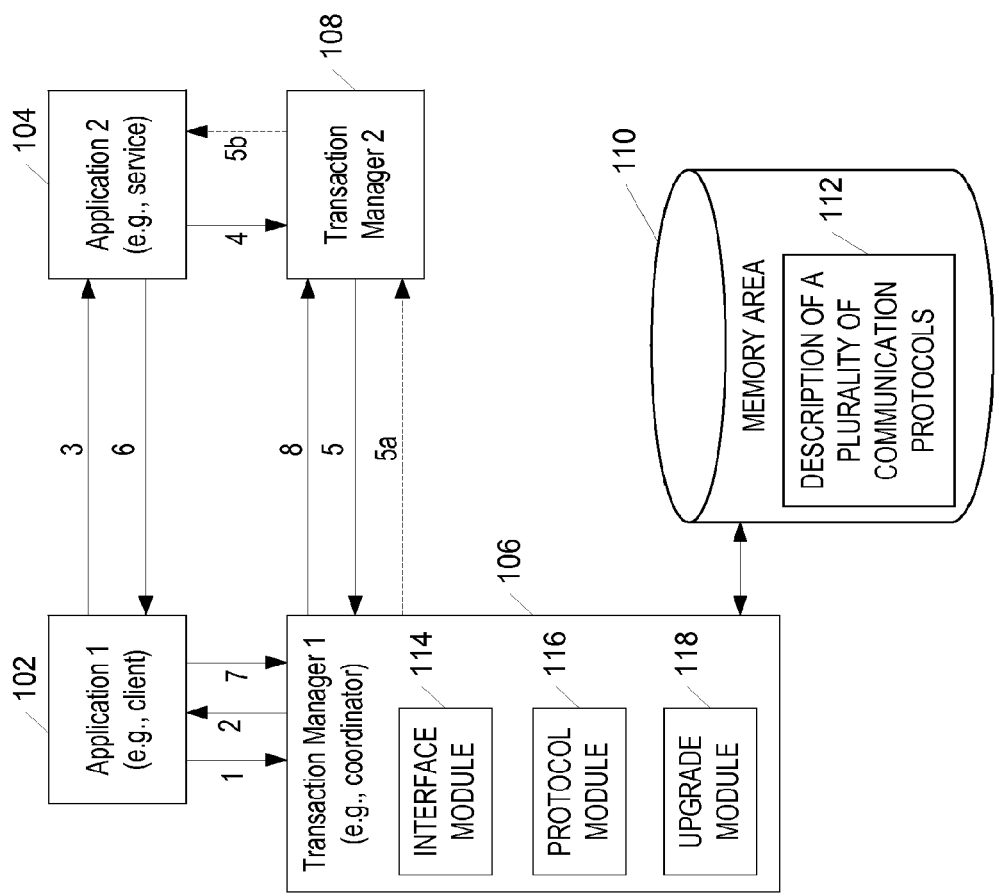
FIG. 1 is an exemplary block diagram illustrating communication flow between a two application programs and their respective transaction managers.

In an embodiment, the invention enables application programs to complete a transaction. In the example of FIG. 1, the application programs may execute on the same computing device, or separate computing devices connected, for example, via a network. Aspects of the invention enable transaction managers associated with the application programs to select and use advanced protocols for communication. In an embodiment, one application is a client that initiates communication with a service such as a web service. The service is an application that waits for clients to communicate, and responds accordingly. In another embodiment, both applications are services.

A transaction is a unit of work in which a series of operations or actions occur. The transaction is a state transformation. For example, as a single unit of work, each transaction results in either "all commit" or "all abort" for the operations or actions. In a database embodiment, exemplary operations or actions in a transaction include adding rows or updating fields. Transactions are used to simplify error recovery for a system. Two applications may share a transaction in that each application may complete a portion of the operations associated with the transaction. In an example such as shown in FIG. 1, Application 1 102 (e.g., a client) uses functionality from Application 2 104 (e.g., a service such as a web service).

Exemplary components in a transaction include the transaction manager, the initiator (e.g., the application that started the transaction), and the resource managers (e.g., the entities that manage data and work, also known as web services). An example flow is shown below.

A. The client application (e.g., the initiator) begins a transaction by requesting a transaction from the transaction manager.

B. The client application asks the resource managers to do work as part of the same transaction. During this operation, the resource managers register with the transaction manager for the transaction (e.g., the resource managers enlist the transaction manager).

C. The client application commits the transaction.

D. The transaction manager coordinates with the resource managers to ensure that all of the resource managers succeed to do the requested work, thus maintaining properties of the transaction.

The transaction managers coordinate the outcome of the transaction. In the example of FIG. 1, only two application programs are involved in the transaction. In other embodiments, there are N application programs involved where N is a positive integer. For example, the transaction managers may be represented as a cascading or nested tree or hierarchy. Transaction managers may support several transaction protocols. Each has different characteristics regarding performance, feature set, and partners that understand them.

Transaction managers are added to a transaction through a process known as propagation. Propagation involves an application component already in the transaction and an application component that is not in the transaction exchanging information about their transaction managers. This is shown in FIG. 1. Propagation carries information about Transaction Manager 1 106 so that Transaction Manager 2 108 knows about the transaction and Transaction Manager 1 106.

In FIG. 1, Application 1 102 is in the transaction, and is coordinated through Transaction Manager 1 106. Application 1 102 uses an application protocol to send a message to Application 2 104 which carries propagation information that Application 2 104 provides to Transaction Manager 2 108. This information is used to connect Transaction Manager 2 108 to Transaction Manager 1 106 using a transaction protocol.

Aspects of the invention provide a mechanism for transparently encoding sufficient information into a propagation information packet (that was not designed to carry such information) to derive possible advanced protocols that may be used in addition to a standard or common protocol. The standard protocol may include, for example, the web services atomic transaction (WS-AT) protocol. Each transaction manager performs aspects of the invention illustrated and described herein to upgrade the protocol for communication with another transaction manager. Aspects of the invention provide for the propagation information to carry enough In an embodiment, the propagation information describing the supported protocols is associated with, or embedded in, the propagation information packet sent to another application. In another embodiment, a location of the propagation information is communicated to the other application. The other application accesses the propagation information directly via the communicated location. In yet another embodiment, no propagation information or location of such is sent to the other application. In this instance, the other application has a priori knowledge of the propagation information such as through an earlier handshake or communication with the application.

In the embodiments where the propagation information is included in the propagation information packet, Transaction Manager 1 106 produces a propagation information packet that it supplies to Application 1 102. This packet contains location information about Transaction Manager 1 106. This information has encoded within it all the relevant alternative advanced protocols, but the encoding is done in a way that will inherently be correctly used by a standard protocol. For instance, the location could be a uniform resource locator (URL), where the additional information is encoded either as query parameters or as path information. In this example, the standard protocol uses the unmodified URL, and Transaction Manager 1 106 correctly processes the unmodified URL. An exemplary URL is shown below. The UpgradeProtocol and UpgradeProtocolPort name-value pairs specify, respectively, an upgrade protocol and protocol-specific upgrade information (e.g., a communications port).

http://Fabrikam123.com/Registration?Tx=802a391a-30db-4425-ab7f-b06eb20ed6c&UpgradeProtocol=4&UpgradeProtocolPort=2372

In another instance, the location of Transaction Manager 1 106 is encoded in simple object access protocol (SOAP) format. There are defined private extensibility fields that may contain any kind of additional element. The advanced protocol information is encoded in these fields and rules similar to the encoding in the URL example above. The extended fields are ignored by recipients who do not specifically recognize and understand the extended fields. An exemplary SOAP excerpt is shown below. The extensibility fields include the "txex" fields.

```
<s:Envelope>
    <S:Header>
        <wscoor:CoordinationContext>
            <wscoor:Identifier>urn:uuid:802a391a-30db-4425-ab7f-b06eb20ed6dc</wscoor:Identifier>
            ...
            <txex:Upgrade>
                <txex:Address>txex.//Fabrikam123.com:2372/Registration</txex>
            </txex:Upgrade>
        </wscoor:CoordinationContext>
        ...
    <S:Header>
</s:Envelope>
``` information that the decision on the transaction protocol may be made by Transaction Manager 2 108, which is clearly after Transaction Manager 2 108 is known. In general, the operation of embodiments of the invention is entirely transparent to the user.

In another instance, the location of Transaction Manager 1 106 is encoded in a SOAP header whose MustUnderstand attribute is set to true. Additional locations are encoded in SOAP headers whose MustUnderstand attribute is set to false. Recipients who understand the original location may optionally explore the collection of SOAP headers in the message for specific protocol headers whose names and schemas are known and understood. Headers that are not understood are ignored. An exemplary SOAP header is shown below, with an explicit port differentiator. In another example, the port differentiator is inferred.

```
<s:Envelope>
    <S:Header>
        <tx:Transaction >
            <tx:Identifier>802a391a-30db-4425-ab7f-b06eb20ed6dc</tx:Identified
        <tx:Address>tx://Fabrikam123.com/Registration</tx>
        </tx:Transaction>
        <txex:UpgradeTransaction>
            <txex:Identifier>802a391a-30db-4425-ab7f-b06eb20ed6dc</texx:Identifier>
        <txex:Address>txex://Fabrikam123.com:2372/Registration</txex>
        </txex:UpgradeTransaction>
        ...
    <S:Header>
</s:Envelope>
```

The propagation information packet is passed by Application 1 102 to Application 2 104. Application 2 104 supplies the propagation information packet to Transaction Manager 2 108. If Transaction Manager 2 108 only supports the standard protocol, the location information is simply used without any further processing. Transaction Manager 2 108, in that case, connects to Transaction Manager 1 106 using the standard protocol.

Alternatively, if Transaction Manager 2 108 supports one or more of the advanced protocols, Transaction Manager 2 108 decodes the additional data in the location information about Transaction Manager 1 106. Transaction Manager 2 108 uses this to determine if there are advanced protocols supported by Transaction Manager 1 106 and Transaction Manager 2 108. If so, Transaction Manager 2 108 selects one and connects to Transaction Manager 1 106 using that transaction protocol. If not, Transaction Manager 2 108 uses the standard protocol.

In an embodiment in which the propagation information is sent to Application 2 104 separately from the propagation information packet (e.g., as out-of-band data), the advanced protocol information is stored in a location available to Transaction Manager 2 108. The location is, for instance, either a lookup service available to Transaction Manager 2 108, or local configuration data. Transaction Manager 1 106 generates location information describing a storage location of the propagation information. Transaction Manager 1 106 provides the location information to Application 1 102. Transaction Manager 2 108 uses the location information to identify and select the communication protocol. In yet another embodiment, the location information or the propagation information itself is already known to Transaction Manager 1 106. having been obtained through an earlier handshake or exchange between the respective applications.

In general, standard transaction protocol propagation includes sufficient information for the recipient to name and locate the originator's transaction manager. Consequently, the information included in the propagation message may contain the transaction manager's name and location information, or the information may include a key or token allowing the recipient to find those details in out-of-band data.

In aspects of the invention, the standard protocol either includes the name and location information for the transaction manager in its propagation information, or that those details can be obtained from out-of-band data. The standard propagation information is used in one of at least two ways to determine if a "negotiate-up" operation can be performed. In one way, the standard protocol may have a flexible definition for how the partner name is passed in the protocol. In such a case, the information necessary to perform a negotiate-up decision may be encoded directly into the name. This information is inherently ignored by the standard protocol. For instance, if a protocol uses a URL string to represent a transaction manager name, the additional information could be stored as either query data (e.g., after the "?" in the URL), or as trailing directory names. In this example, the standard protocol makes no decisions based on that data, and the partner providing that name responds correctly to it being used without change.

In another way, the standard protocol may not have a flexible definition for the passing the partner name. In this case, the name is used as a key to look up information about the transaction manager's upgrade possibilities.

In an embodiment of the invention, the propagation information itself is passed unmodified with respect to the standard form. However, if Transaction Manager 2 108 understands how to negotiate up, it may use the location information (or an agreed subset of it) to locate information on Transaction Manager 1 106. At that point, Transaction Manager 2 108 determines if there is an appropriate advanced protocol, and connects back to Transaction Manager 1 106 using that protocol.

In operation, the sequence of the communication flow between Application 1 102, Application 2 104, Transaction Manager 1 106, and Transaction Manager 2 108 is indicated by numbered arrows between these elements. In an example, Application 1 102 has decided that it needs functionality provided by Application 2 104 to complete a transaction. Application 1 102 asks Transaction Manager 1 106 (arrow 1) for propagation information or other data that, in part, identifies Transaction Manager 1 106 and enables another transaction manager to locate and communicate with Transaction Manager 1 106. This data may take the form of a binary large object (e.g., a "blob" of data) or other implementation-specific data (e.g., base64 encoding). Transaction Manager 1 106 generates the data which describes, among other items, a plurality of communication protocols supported by Transaction Manager 1 106. The description of the plurality of communication protocols 112 may be stored in a memory area 110 accessible by Transaction Manager 1 106.

The data object is provided by Transaction Manager 1 106 to Application 1 102 (arrow 2). Application 1 102 inserts the data object into a message or token sent to Application 2 104 (arrow 3). For example, the propagation information is associated with, or embedded into, the message representing the propagation information packet. Alternatively, the data object may be provided to Application 2 104 separately from the message to Application 2 104.

Application 2 104 presents the data object to Transaction Manager 2 108 (arrow 4). Transaction Manager 2 108 selects a protocol and communicates with Transaction Manager 1 106 (arrow 5) to, in part, let Transaction Manager 1 106 know that Transaction Manager 2 108 will be a part of the transaction. For example, Transaction Manager 1 106 receives a selection of one of the supported communication protocols from Transaction Manager 2 108.

Arrows 5*a* and 5*b* indicate the success or failure of Transaction Manager 2 108 in selecting the protocol. Application 2 104 completes the designated operations in the transaction and sends the status and/or results to Application 1 102 (arrow 6). Application 1 102 informs Transaction Manager 1 106 of the completion of the transaction (arrow 7). Transaction Manager 1 106 (e.g., the coordinator) initiates a two-phase commit (or other committal process) by communicating with Transaction Manager 2 108 (arrow 8).

In an embodiment, either of the transaction managers may initiate a re-negotiation of the communication protocol in a manner similar to that illustrated in FIG. 1.

The operation of Transaction Manager 1 106 may be represented by the execution of a plurality of computer-executable components such as shown in FIG. 1. An interface module 114 receives a request from Application 1 102 for propagation information. The propagation information, stored in a storage location, includes data describing a plurality of communication protocols. A protocol module 116 generates location information identifying the storage location of the propagation information. The protocol module 116 embeds or otherwise associates the location information into a propagation information packet. The packet also includes support for a standard or common protocol that Transaction Manager 2 108 also supports. The interface module 114 provides the propagation information packet to Application 1 102 which communicates the packet to Application 2 104. Transaction Manager 2 108 uses the location information to access the propagation information in the storage location. An upgrade module 118 negotiates with Transaction Manager 2 108 to dynamically identify one of the plurality of communication protocols to use for communication with Transaction Manager 1 106 via the interface module 114. The negotiation is based on the propagation information.

The interface module 114, the protocol module 116, and the upgrade module 118 are stored on one or more computer-readable media accessible by Transaction Manager 1 106. The computer readable media, which include both volatile and nonvolatile media, removable and non-removable media, may be any available medium. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

An example implementation includes the WS-AT protocol implementation in a communication framework. This implementation uses the extension elements provided by the WS-AT header format to add information about a proprietary, highly-optimized protocol, called OleTx. This protocol, unlike WS-AT, is not interoperable, and can be used only on particular platforms. Aspects of the invention enable a dynamic upgrade from WS-AT to OleTx under proper conditions (e.g., both sides speak OleTx and the network configuration is favorable). The implementation of WS-AT is completely interoperable with other WS-AT implementations, while enabling capable implementations to upgrade to OleTx as needed.

Figure 2:
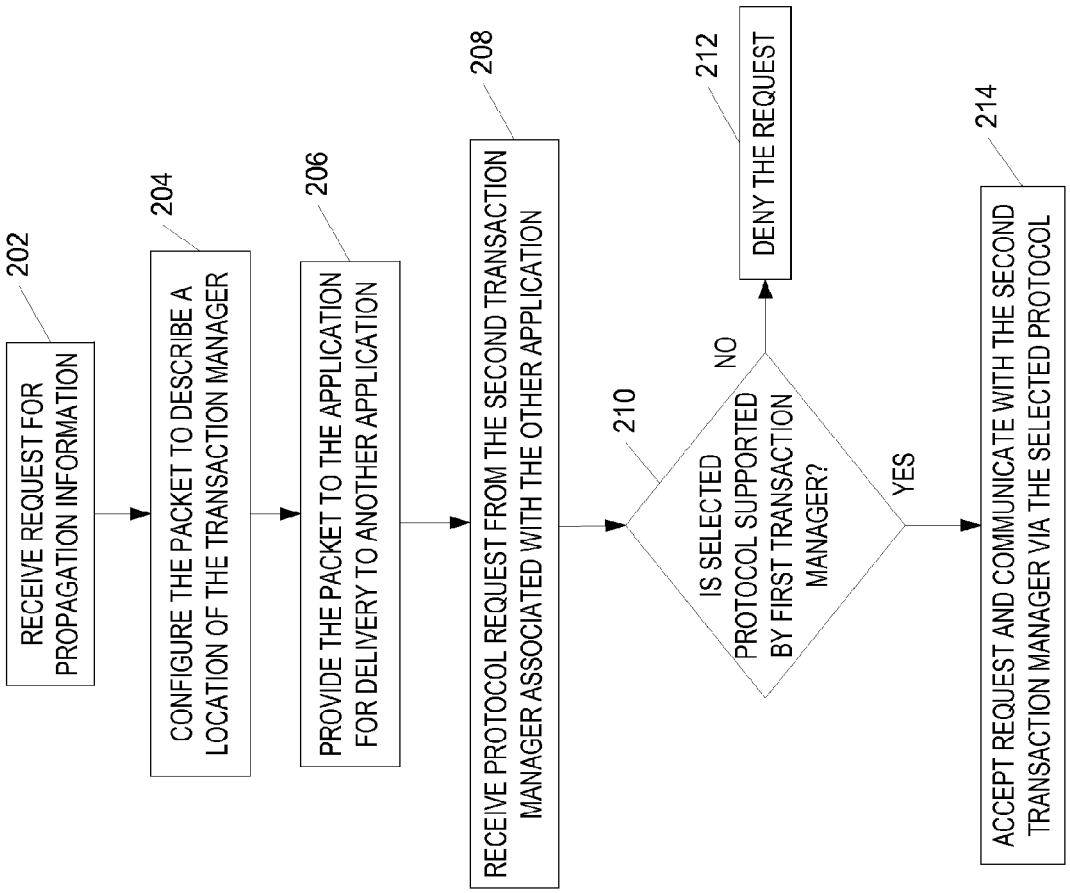
FIG. 2 is a flow chart illustrating operation of a transaction manager.

Referring next to FIG. 2, a flow chart illustrates operation of a transaction manager such as Transaction Manager 1 106 in FIG. 1. In this example, a description of the communication protocols supported by the first transaction manager is stored in a memory area. In an embodiment, the description is sufficient enough to enable the second transaction manager to support the protocols. That is, there is no need for the second transaction manager to be separately hard-coded to support the protocols. An example of such a sufficient description is a mapping between the tags or fields of a standard protocol and the tags or fields of an advanced protocol. At 202, a first transaction manager receives a request from an application for propagation information. At 204, the first transaction manager configures a propagation information packet to describe a location of the first transaction manager. The packet is provided to the application at 206 for delivery to another application. The other application has a second transaction manager. The first transaction manager receives, at 208, a protocol request from the second transaction manager. The protocol request is a request for the first transaction manager to communicate with the second transaction manager via a selected communication protocol. The communication protocol was selected by the second transaction manager, accessing the memory area, from the description of the plurality of communication protocols in the memory area.

If the selected protocol is not supported by the first transaction manager at 210, the first transaction manager denies the request at 212. If the selected protocol is supported by the first transaction manager at 210, the first transaction manager accepts the request at 214 and communicates with the second transaction manager via the selected protocol to complete a transaction.

In operation, data describing a new communication protocol may be added to the propagation information. If the second transaction manager does not support the new communication protocol or has not been updated to be aware of the existence of the new protocol (or supports the new protocol, but chooses not to implement or select the new protocol), the second transaction manager selects another protocol from the protocols described in the propagation information. As such, aspects of the invention support the addition of new protocols while maintaining compatibility with transaction managers (e.g., first and/or second transaction managers) that do not support or choose to not support the new protocols. Embodiments of the invention support post-hoc adaptation in this manner.

For example, the propagation information packet or other propagation token has one or more slots defined a priori for a known set of transaction manager protocols (e.g., the protocols are supported by the propagation token). Aspects of the invention enable the handling of protocols that are not defined a priori into the propagation information packet (e.g., protocols that are not supported by the propagation token). In such instances, the transaction managers select a protocol other than the protocol that is not supported by the propagation token.

The computer-executable instructions and components described and illustrated herein constitute exemplary means for dynamically upgrading the communication protocol for use between the first transaction manager and the second transaction manager.

In an embodiment of the invention, a general purpose computing device executes the applications and transaction managers described herein. The transaction managers may operate in a networked environment using logical connections between remote computers. The remote computer may be a personal computer, a server, a router, a network personal computer, a peer device or other common network node. The logical connections between the computers may include a local area network (LAN) and a wide area network (WAN), but may also include other networks. The LAN and/or WAN may be a wired network, a wireless network, a combination thereof, and so on. Such networking environments are commonplace in offices, enterprise-wide computer networks, intranets, and global computer networks (e.g., the Internet).

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as one or more components or program modules, executed by one or more computers or other devices. In an embodiment, one or more computer-readable media have computer-executable instructions for performing the method illustrated in FIG. 1 and FIG. 2. Aspects of the invention may be implemented with any number and organization of such components or modules. Generally, program modules include, but are not limited to, routines, programs, objects, components, and data structures that perform particular tasks or implement particular abstract data types. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method of communicating using a dynamically selected communication protocol, the method comprising:
   receiving, by a first transaction manager associated with a first application, propagation information from a second transaction manager associated with a second application, wherein the propagation information is encoded, and wherein the propagation information comprises:
      data describing one or more advanced communication protocols for upgrading over a standard protocol; and
      additional data describing at least one new communication protocol for upgrading over a standard communication protocol, wherein a first computing device does not support the new communication protocol;
   decoding the encoded propagation information;
   dynamically selecting a communication protocol based on the data describing the one or more advanced communication protocols, the dynamically selected communication protocol being other than the new communication protocol; and
   communicating by the first transaction manager with the second transaction manager via the dynamically selected communication protocol.

2. The computerized method of claim 1, wherein receiving the propagation information further comprises:
   receiving a propagation information packet.

3. The computerized method of claim 2, wherein the propagation information packet identifies a common communication protocol capable of being understood by both the first transaction manager and the second transaction manager.

4. The computerized method of claim 2, further comprising:
   receiving the propagation information packet separately from the propagation information.

5. The computerized method of claim 1, further comprising:
   receiving, by the first transaction manager, location information describing a storage location of the propagation information on a second computing device associated with the second transaction manager.

6. The computerized method of claim 1, wherein receiving the propagation information further comprises:
   receiving at least one of: a propagation information packet and a protocol token.

7. The computerized method of claim 1, wherein communicating with the second transaction manager via the dynamically selected communication protocol comprises communicating with the second transaction manager via the dynamically selected communication protocol to complete a transaction.

8. A system comprising:
   a computer-readable storage device having computer-readable instructions;
   a processor executing the computer-readable instructions that cause a first computing device to:
      receive, by a first transaction manager associated with the first computing device, propagation information from a second transaction manager associated with a second computing device, wherein the propagation information is encoded, and wherein the propagation information comprises:
data describing one or more advanced communication protocols for upgrading over a standard protocol; and
additional data describing at least one new communication protocol for upgrading over a standard communication protocol, wherein the first transaction manager does not support the new communication protocol;
decode the encoded propagation information;
dynamically select a first communication protocol based on the data describing the one or more advanced communication protocols, the dynamically selected first communication protocol being other than the new communication protocol; and
communicate by the first transaction manager with the second transaction manager via the dynamically selected first communication protocol.

9. The system of claim 8, further comprising:
re-negotiate, by the first transaction manager with the second transaction manager, to select a second communication protocol of the one or more advanced communication protocols.

10. The system of claim 8, wherein receiving the propagation information further comprises:
receive a propagation information packet.

11. The system of claim 10, wherein the propagation information packet identifies a common communication protocol capable of being understood by both the first transaction manager and the second transaction manager.

12. The system of claim 8, further comprising:
receive, by the first transaction manager, location information describing a storage location of the propagation information on the second computing device.

13. The system of claim 8, wherein receiving the propagation information further comprises:
receive at least one of: a protocol token and a propagation information packet.

14. The system of claim 8, wherein communicating with the second transaction manager via the dynamically selected first communication protocol comprises communicating with the second transaction manager via the dynamically selected first communication protocol to complete a transaction.

15. A first computing system comprising:
at least one processor; and
at least one memory communicatively coupled to the at least one processor, the at least one memory having computer-readable instructions that when executed by the at least one processor cause the first computing system to perform a method of negotiating use of a communication protocol, the method comprising:
receiving, by a first transaction manager associated with the first computing system, propagation information from a second transaction manager associated with a second computing system, wherein the propagation information is encoded, and wherein the propagation information comprises:
data describing one or more advanced communication protocols for upgrading over a standard protocol; and
additional data describing at least one new communication protocol for upgrading over a standard communication protocol, wherein the first transaction manager does not support the new communication protocol;
decoding the encoded propagation information;
dynamically selecting a first communication protocol based on the data describing the one or more advanced communication protocols, the dynamically selected first communication protocol being other than the new communication protocol; and
communicating by the first transaction manager with the second transaction manager via the dynamically selected first communication protocol.

16. The first computing system of claim 15, further comprising:
re-negotiating, by the first transaction manager with the second transaction manager, to select a second communication protocol of the one or more advanced communication protocols.

17. The first computing system of claim 15, wherein receiving the propagation information further comprises:
receiving a propagation information packet.

18. The first computing system of claim 17, wherein the propagation information packet identifies a common communication protocol capable of being understood by both the first transaction manager and the second transaction manager.

19. The first computing system of claim 15, further comprising:
receiving, by the first transaction manager, location information describing a storage location of the propagation information on the second computing system.

20. The first computing system of claim 15, wherein receiving the propagation information further comprises:
receiving at least one of: a protocol token and a propagation information packet.

* * * * *